(12) United States Patent
Ylonen

(10) Patent No.: US 7,987,214 B2
(45) Date of Patent: Jul. 26, 2011

(54) DETERMINING THE ADDRESS RANGE OF A SUBTREE OF A LINEARIZED TREE

(75) Inventor: Tatu J Ylonen, Espoo (FI)

(73) Assignee: Tatu Ylonen Oy, Espoo (FI)

( * ) Notice: Subject to any disclaimer, the term of this patent is extended or adjusted under 35 U.S.C. 154(b) by 390 days.

(21) Appl. No.: 12/201,514

(22) Filed: Aug. 29, 2008

(65) Prior Publication Data

US 2010/0057792 A1 Mar. 4, 2010

(51) Int. Cl.
G06F 7/00 (2006.01)
G06F 17/30 (2006.01)
(52) U.S. Cl. .......................... 707/813; 707/797; 707/800
(58) Field of Classification Search .................. 707/600, 707/813
See application file for complete search history.

(56) References Cited

U.S. PATENT DOCUMENTS 7,415,452 B1  8/2008  Ayers

OTHER PUBLICATIONS

V. Gopalakrishna and C. E. Veni Madhavan: Performance Evaluation of Attribute-based Tree Organization, ACM Transactions on Database Systems, 6(1):69-87, 1980.
J. Budgaard: The Development of an Ada Front End for Small Computers, ACM SIGAda Ada Letters, vol. V, Issue 2, pp. 321-328, 1985.
J. E. Stucka and R. Wiss: Stack Algorithm for Extracting Subtree from Serialized Tree, IBM Technical Disclosure Bulletin, 37(3):3-6, 1994.
P. A. Bernstein, V. Hadzilacos and N. Goodman: Concurrency Control and Recovery in Database Systems, Addison-Wesley, 1987, Section 5, pp. 143-166.
N. Shavit & D. Touitou: Software Transactional Memory, ACM Symposium on the Principles of Distributed Computing, 1995 (extended version).
M. Greenwald: Non-Blocking Synchronization and System Design, PhD Thesis, Department of Computer Science, Stanford University, 1999 (especially Section 3.2 pp. 40-65).
H. Gao: Design and Verification of Lock-free Parallel Algorithms, PhD Thesis, Wiskunde en Natuurwetenschappen, Riksuniversiteit Groningen, 2005 (especially Section 2 pp. 21-56).
R. Jones and R. Lins: Garbage Collection: Algorithms for Dynamic Memory Management. Wiley, 1996 (especially pp. 150-153, 165-174, 187-193, 199-200, 214-215, 222-223).

*Primary Examiner* — Paul Kim

(57) ABSTRACT

A method and computer system for determining the memory address range of a subtree of a linearized tree of objects or the original version of such tree when the tree has been modified or is concurrently being modified by other threads. The primary application of the method is in garbage collection for multiprocessor shared memory computers with very large memories, but it is also relevant for a number of other applications.

7 Claims, 8 Drawing Sheets

801 COMPUTER READABLE SOFTWARE DISTRIBUTION MEDIUM

802 PROGRAM CODE MEANS

803 PROGRAM CODE MEANS FOR CAUSING THE END OF THE ORIGINAL VERSION OF A MODIFIED LINEARIZED TREE TO BE COMPUTED

FIG 8

DETERMINING THE ADDRESS RANGE OF A SUBTREE OF A LINEARIZED TREE

CROSS-REFERENCE TO RELATED APPLICATIONS

Not Applicable

INCORPORATION-BY-REFERENCE OF MATERIAL SUBMITTED ON ATTACHED MEDIA

Not Applicable

TECHNICAL FIELD

The invention relates to the implementation of garbage collection as an automatic memory management method in a computer system, and particularly to the management of a global multiobject graph in multiobject-based garbage collection. It also relates to tree data structures and linearization (serialization) of data structures in general, and may have applications in a number of diverse fields.

BACKGROUND OF THE INVENTION

Automatic memory management, or garbage collection, is a mature field that has been studied for about fifty years. An extensive survey of the field is provided by the book 'Garbage Collection: Algorithms for Dynamic Memory Management' by R. Jones and R. Lins (Wiley, 1996), which is basic reading for anyone seriously involved in the art of garbage collection. Even since the publication of this book, the field has seen active development due to the significant commercial interest in Java and other virtual machine based programming environments and growing interest in intelligent systems.

U.S. patent application Ser. No. 12/147,419 by the same inventor, which is incorporated herein by reference in its entirety, presented a garbage collection system based on multiobjects. A multiobject is defined as a linearized tree of objects with one entry point and any number of exits.

The mentioned patent application provided that multiobject construction comprises copying the objects selected to form the multiobject into consecutive memory locations (with possibly some padding or holes, as described in the specification). The application also provided that the objects be stored in the linearized representation in a specific order, such as left-to-right depth first order, as described in the application.

The left-to-right depth first order is basically the order in which objects are visited when performing a depth-first traversal of the object graph and traversing the pointers within each object left-to-right, i.e., the pointer at the lowest memory address first; right-to-left depth first order is the same except that pointers within each object are traversed right-to-left, i.e., the pointer at the highest memory address first. Traversing the object graph is often called tracing in garbage collection literature.

In many programming environments, including the most popular virtual machines and runtimes for languages such as Java, C# and Lisp, dynamic updates to the object graph are possible (that is, data fields, or cells, containing pointers can be written at any time and made to point somewhere else or nowhere at all). Even without such updates, a new reference can be added in the nursery that points to the middle of an existing multiobject. The application noted that "in some embodiments a more liberal structure for multiobjects may be used than the strict linearized tree. For example, writes to within the multiobject may render parts of the multiobject unreachable, and added external references to objects within the multiobject may make it desirable to have nested multiobjects or entries pointing to within multiobjects."

It is advantageous for a multiobject-based garbage collection system to maintain a reachability graph of multiobjects. As an application runs, it may perform arbitrary modification to the underlying object graph, implying corresponding changes to the multiobject graph. On the targeted large multiprocessor computers with very large memories, it can be expected that application programs will also utilize multiple threads of execution which are updating the object (and multiobject) graph concurrently. Locking, lock-free data structures and/or software transactional memory may be used for ensuring consistency of internal data structures during concurrent execution.

When a cell in an object is written by an application, the old value of that cell becomes unreachable unless it has references from other locations. Such updates may render parts of multiobjects unreachable (essentially the subtree referenced by the old value of the written cell).

Also, when a value is written to a cell or to a register, the value may point to the middle of a multiobject (it may be the root of a subtree of the multiobject). Many such values, particularly those written into registers, are short-lived, and there is no need to update the multiobject graph immediately.

Generally, it is not necessary to update the multiobject graph immediately when the object graph changes. However, multiobject garbage collection advantageously depends on the multiobject graph being up to date. Thus, it is desirable to bring the multiobject graph up to date at the beginning of each evacuation pause.

It is common practice in garbage collection and some other systems to use a software (or hardware) component called the write barrier to analyze writes and to record certain information about writes. Most garbage collection systems only require (the mutator part of) the write barrier to coarsely record which objects may have been written. Card marking is a popular implementation of a write barrier in such systems, leaving more work to be done in the card scanning phase (which is herein also considered part of the write barrier even though it may be done at garbage collection time). Write barrier implementations using hash tables and remembered sets have also been described in the literature. (Here, we interpret the term write barrier rather broadly, including not only the tests whether the write should be recorded (often inlined), but also the code that actually records the write, and the code that processes any write barrier buffers, remembered set buffers, or performs card scanning. Some other authors use it more narrowly, referring only to the test of whether a write should be recorded.)

In a multiobject garbage collection system, the multiobject graph is preferably updated at the start of each evacuation pause using the information saved by the write barrier.

One solution for efficiently maintaining a multiobject graph is to allow nested multiobjects, such that references to objects within a multiobject can be represented in the multiobject graph by a reference to a nested multiobject that has an implicit reference from its containing multiobject (the exact memory location containing the reference not necessarily known) and one or more references from other multiobjects or registers/roots.

It is also important to track how much space in each multiobject has been rendered inaccessible by writes to the multiobject. This information is required for accurately determining the priority of collecting each memory region (the priority sometimes called 'gc_index'). Such determination in a multiobject garbage collection system requires determining the size or range of the subtree rendered inaccessible.

However, efficiently determining which memory addresses should be included in a nested multiobject and which memory addresses are rendered inaccessible by a write requires determining the range of a subtree in the multiobject as the multiobject was when it was originally created.

Linearization of trees (and arbitrary graph structures) is a well-known technique, and is widely deployed e.g. for storing trees in files, communicating them over data transmission networks, serialization, and implementing persistent object systems.

The write barrier in a garbage collector, including some copying write barriers, are described in Jones & Lins, e.g. pp. 150-153, 165-174, 187-193, 199-200, 214-215, 222-223 (and various details on other pages as well).

A use of linearized trees with attention to the end of a subtree was described in V. Gopalakrishna and C. E. Veni Madhavan: Performance Evaluation of Attribute-Based Tree Organization, ACM Transactions on Database Systems, 6(1): 69-87, 1980. Among other things, they describe the creation of a linearized tree and a method for computing the end of a subtree from the address of the nearest right sibling. However, they do not describe updates to the tree once it has been created or accessing the original after such updates, and their method for computing the end of the subtree uses the address of the right sibling, which is presumed to be available at that point.

Another use of linearized trees, including left-to-right and right-to-left traversals and construction, including modifications to the tree by essentially reconstructing the entire tree and replacing subtrees, is described in J. Budgaard: The Development of an Ada Front End for Small Computers, ACM SIGAda Ada Letters, Vol. V, Issue 2, pp. 321-328, 1985. However, their system does not appear to include a means for finding the end of a subtree from a tree (other than performing a full traversal), their right-to-left traversals are for a different purpose (some compiler passes are easier to implement when traversing the intermediate tree representation in reverse order) and perform e.g. compiler optimization steps for each encountered node, not subtree last address determination.

J. E. Stucka and R. Wiss: Stack Algorithm for Extracting Subtree from Serialized Tree, IBM Technical Disclosure Bulletin, 37(3):3-6, 1994 presents "an efficient algorithm for tree processing in dynamic environments; it can be used to identify subtree members within a serialized tree or to construct an entire hierarchical tree from a serialized tree." However, the method and its goals appear to be different from the method of the present invention.

Object versioning in general and multiversion concurrency control are well-known methods in database systems (see e.g. P. A. Bernstein, V. Hadzilacos and N. Goodman: Concurrency Control and Recovery in Database Systems, Addison-Wesley, 1987, Section 5, pp. 143-166). Also, logs have been used to record old values of modified locations in database systems at least since 1960's and later in the main memory context with software transactional memory. Software transactional memory is described e.g. in Nir Shavit & Dan Touitou: Software Transactional Memory, ACM Symposium on the Principles of Distributed Computing, 1995 (extended version) and M. Greenwald: Non-Blocking Synchronization and System Design, PhD Thesis, Department of Computer Science, Stanford University, 1999 (especially Section 3.2 pp. 40-65).

Lock-free hash tables are discussed e.g. in Hui Gao: Design and Verification of Lock-free Parallel Algorithms, PhD Thesis, Wiskunde en Natuurwetenschappen, Riksuniversiteit Groningen, 2005 (especially Section 2 pp. 21-56).

Unfortunately, no methods for efficiently determining the range of a subtree in the original version of a linearized tree modified by writes have been available. Even in the case of non-modified trees, the only known method is the one by Gopalakrishna & Madhavan, which requires storing the right sibling addresses, which consumes a significant amount of extra space and implies processing overhead when constructing the linearized tree.

BRIEF SUMMARY OF THE INVENTION

It is the objective of the present invention to provide an efficient method for determining the memory address range of a subtree within a linearized tree of objects even if the linearized tree has been modified by writes arbitrarily many times after it was created and even if further such modifications occur concurrently with determining the range of the subtree. Objects in the tree are assumed to consist of cells, some of which may contain pointers (references) to other cells. The objects could be e.g. structs in the C programming language, classes in Java, or conses (pairs) in Lisp.

The invention builds on storing the objects that constitute a multiobject in a specific order in their linearized representation. Preferably, this order is the left-to-right depth first order, but certain other orders could also be used, such as right-to-left depth first order.

The method is described assuming the linearized tree was constructed using preorder traversal; adapting it to inorder or postorder traversal is described at the end of the detailed description.

In a depth-first order (preorder) the root object of a subtree of the linearized tree is always its leftmost object. The challenge thus is to find the rightmost object of the subtree.

The basic idea is to perform a traversal of the subtree in the linearized tree in the applicable reverse order—in the preferred case of the linearized tree being constructed in a left-to-right depth first order, the right-to-left depth first order.

During the traversal, a check is made to see if the current cell has been modified (written) since the linearized tree was created. While conceptually simple, this test is rather intricate in a larger-scale concurrent system. If the cell no longer contains its original value, the saved original value of the cell is retrieved and used instead.

Then, a check is made if the cell value (after retrieving the original value, if applicable) is a heap cell. If not, traversal continues with the next cell. Otherwise, a check is made to see if the cell points to within the same linearized tree, but not to its root. If not, then traversal continues with the next cell.

If the cell value is larger than the largest cell visited so far, then the largest cell visited so far is set to the current cell, and traversal recurses into the object referenced by the cell. (This is assuming the cell has tag bits, if any, at the least significant bits; otherwise the memory address of the object referenced by the cell should be used instead of the cell itself.)

If the cell value is less than the largest cell visited so far, then the traversal terminates. Because we are traversing the tree in the applicable reverse order, it is not possible for further cells in the subtree to increase the largest visited cell value.

Since the largest visited cell cannot increase after a smaller cell has been encountered, there is no need to use a generic tree traversal algorithm with a stack. Instead, recursing into the object referenced by the cell can be implemented by simply making that object our current context, replacing the previous context (this can be seen as an instance of tail recursion elimination). Only the rightmost (or more generally the first in the applicable reverse order) heap cell containing a pointer to within the same linearized tree but not its root needs to be followed. If the current object contains no such cell, then the current object must be the rightmost cell, as any cells that a standard traversal might visit later must be to the left of the current cell.

Once the traversal terminates, the end of the subtree can be determined by adding the size of that object to the starting address of the object referenced by the largest cell (it is the last object of the subtree).

If the tree is balanced, this completes in a logarithmic time relative to the size of the linearized subtree; however, in the worst case, it completes in time linear to the size of the subtree (the worst case occurs when the subtree is a list). If the linearized trees are of limited size (as is the case in the referenced earlier application), even the worst case will take a reasonable amount of time. However, in some situations the subtree range determination can be performed for all nodes of a list (e.g., when using the Common Lisp NREVERSE function, in G. L. Steele: Common Lisp The Language, 2nd. ed., Digital Press, 1990, p. 393), and in such cases the total worst case complexity becomes $O(N^2)$, which is not tolerable.

This worst case is eliminated by caching the results for some of the visited cells. A good practical policy is to cache the rightmost address of every Nth of the visited nodes (where values in roughly the range 4 to 32 are likely to be good candidates for N).

Some aspects of the invention relate to dealing with concurrency issues when the method is invoked by several processing cores in parallel, such as when processing write barrier buffers at the start of an evacuation pause, and to minimization of lock contention in such environments.

The invention will be described in the context of a garbage collection method, more precisely the multiobject-based garbage collection method presented in U.S. Ser. No. 12/147,219. However, it is likely that the invention will find applications in other areas as well. Object oriented databases, persistent object systems, distributed computing systems, software transactional memory implementation, pattern matching algorithms used in bioinformatics, and programs manipulating performing complex manipulations on XML or HTML encoded data are examples of potential additional application areas. Some adaptation within the capabilities of an ordinary person skilled in the art is likely to be necessary when the invention is applied to new problems and used in different contexts.

BRIEF DESCRIPTION OF THE SEVERAL VIEWS OF THE DRAWING(S)

FIG. 8 illustrates a computer usable software distribution medium having computer usable program code means embodied therein for causing the end of a subtree of the original version of a modified linearized tree to be computed.

DETAILED DESCRIPTION OF THE INVENTION

Multiobject garbage collection is based on grouping objects in the application's heap into trees. The trees are then stored in memory in (nearly) consecutive memory locations in a specific order. Storing of trees (which are essentially two-dimensional) in a linear (consecutive) sequence of memory locations is called linearizing (or serializing) the tree. Linearization is frequently employed when storing trees (or more complex data structures) in files or when transmitting them over a communications network. In multiobject garbage collection, grouping objects into trees and storing them in linearized format allows many basic garbage collection operations to be performed much more efficiently than if they were performed on the object level.

A computer system where multiobject garbage collection is used may contain very many—hundreds of millions—of such linearized trees. Such trees may occupy hundreds of gigabytes of memory. Thus, memory usage is a significant design consideration. Furthermore, many such trees are relatively shortlived, and they are very frequently created by nursery garbage collection, so processor time consumption is important.

Multiobject garbage collection is primarily targeted for multiprocessor computers with a few to several hundred processing cores in the same shared memory. In such systems, lock contention and designing the software to avoid lock contention is a critical architectural issue, and failure to minimize lock contention may render such systems inoperable. The whole field of software transactional memory and lock-free data structures has evolved from trying to reduce lock contention and to ease programming of such systems.

Figure 1:
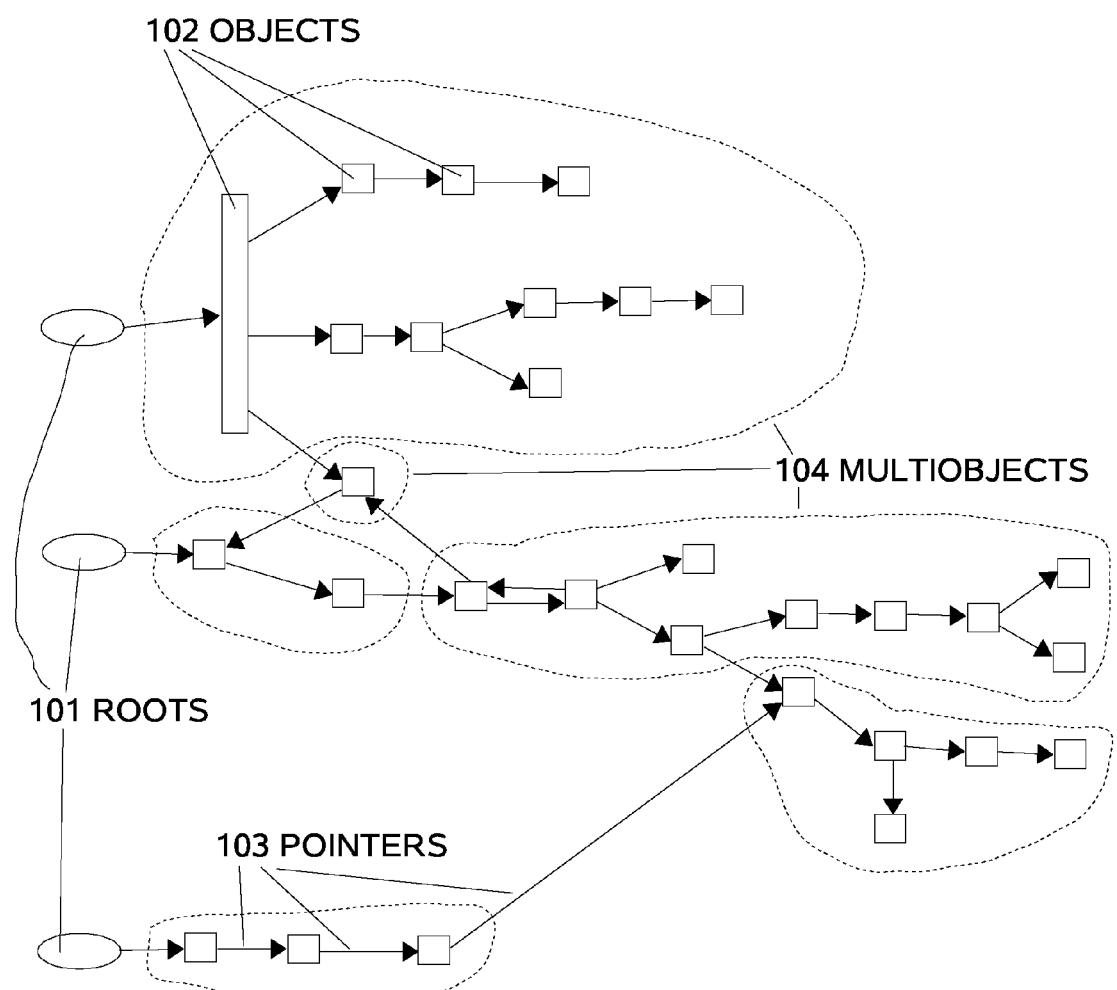
FIG. 1 (prior art) illustrates how objects can be grouped to multiobjects.

FIG. 1 (prior art) illustrates the grouping of objects into multiobjects in such an environment. The roots (101) represent global variables, program stack frames, registers and other cells that are intrinsically considered live during garbage collection. They reference objects (102). Objects can contain an arbitrary number of references (103) to other objects, depending on their type. Objects themselves in this context are considered to be contiguous in memory (as is the case in the typical implementation of objects in most programming languages, though nothing prevents implementing the objects visible in a programming language as multiple lower-level objects; in fact, such representation is common in the implementation of functional programming languages). Here, object refers to the lower level implementation object that is contiguous in memory.

Each object is considered to consist of a certain number of cells (and may contain additional data not treated as cells, such as pointers to metaobjects or virtual method tables). Each cell may contain a tagged or an untagged value (tag bits are frequently used to indicate the type of the value stored in a memory location in various virtual machine and Lisp implementations; in the description, it is assumed that the tag bits are stored in the least significant bits of a call, but the method is equally applicable if they are stored in the most significant bits, with e.g. checking for largest cell changed to mean the cell referencing the highest memory address). The size of a cell is typically 32 or 64 bits. Cells which contain pointers (103) are called heap cells.

The objects form trees (104) of arbitrary sizes (though in multiobject garbage collection the size of trees is advantageously limited to some reasonable value by splitting very large trees). Some trees may contain only one object, while others may contain thousands of objects. When linearized, the trees are called multiobjects in the multiobject garbage collection context.

Figure 2:
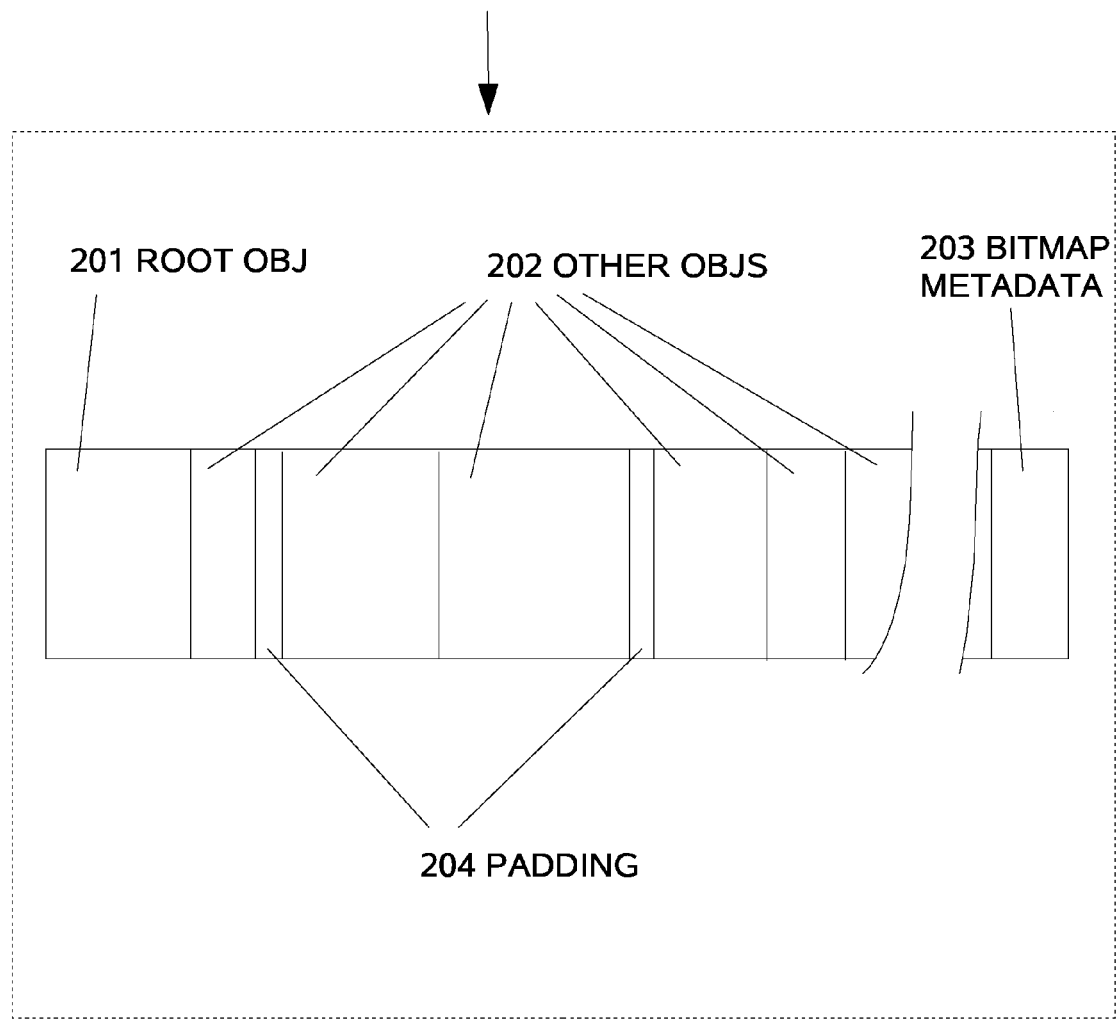
FIG. 2 (prior art) illustrates the layout of a multiobject (linearized tree) in memory.

FIG. 2 (prior art) represents a multiobject (200) in linearized form. The linearized form advantageously begins with the root object (201), and is followed by arbitrarily many other objects (202) in the order in which the tree was constructed. The preferred order is the left-to-right depth first order, though e.g. right-to-left depth first order could also be used. The objects may be followed (or preceded, or otherwise associated with) by metadata (203) that contains additional information relating to the linearized tree. In the context of the present invention, the metadata advantageously contains a bitmap (i.e., a one-dimensional array of bits) with one bit for each cell of the multiobject. Hereinafter the bitmap will be called the written bitmap, and it indicates for each cell of the object whether that cell has been modified (written) after the multiobject was constructed (the modifications may render the multiobject as seen by the application program a non-tree structure, even though it was a tree when it was created). If cell size is 64 bits, the size of the bitmap is roughly 1.6% of the size of the multiobject. Some additional padding (204) may be included between objects to ensure that all objects are properly aligned (i.e., stored at a memory address that is e.g. a multiple of 8 or 16) or for other purposes.

Figure 3:
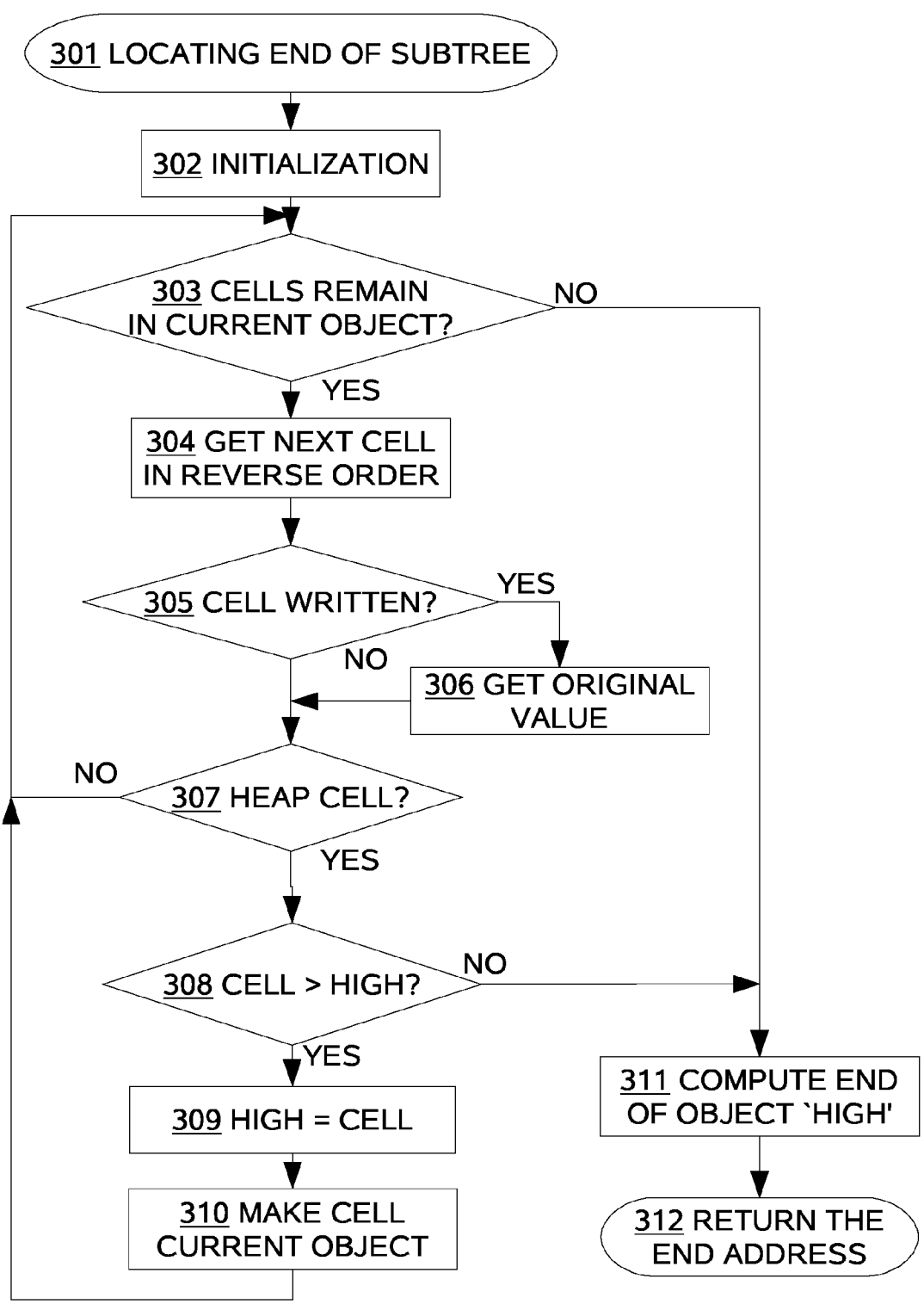
FIG. 3 illustrates the method for determining the end of a subtree of the original version of a modified linearized tree on a general level.

FIG. 3 illustrates the method for computing the end of a subtree of the original version of a linearized tree. The method is most advantageously implemented as a subprogram (procedure or function) in a computer program (software package), but could also be implemented directly in hardware in e.g. special processors for virtual machines or garbage collection. The subprogram (301) advantageously gets as arguments a cell (pointer) referencing the root of the linearized tree, a pointer to the first memory address of the linearized tree (usually the same as the pointer to the root object, so it would typically not be separately passed), and either the last address of the linearized tree or the size of the linearized tree.

The initialization step (302) initializes the largest cell seen so far ('HIGH') to the initial cell (root of the subtree). It also makes the object referenced by that cell the current object. (Making it the current object might mean getting a pointer to its first cell and setting an index variable to the index of its rightmost cell, assuming the applicable reverse order is the right-to-left depth first order.)

The program then iterates over the cells of the current object (in the applicable reverse order), inspecting each cell in turn until it finds a cell whose original value is a heap cell that points to within the same linearized tree and to an object other than its root. Step (303) checks whether cells remain in the current object; for example, it could check if the index is greater than or equal to zero. If no more cells remain, the subprogram moves to step (311) to compute the last address of the object referenced by the largest cell seen ('HIGH') and returns it in (312).

If (303) determines that cells remain in the current object, the current cell is retrieved in step (304). Getting the next cell generally involves computing the address of the current cell (i.e., the start of the current object plus the index multiplied by cell size) and reading the value at that address (though reading could be postponed until it has been checked if the cell has been written, and the read only performed if it has not been written, as the value is not used in the case that the cell has been written and the check only uses the address). Additionally, getting the cell includes advancing the index (or pointer, stack, list, or whatever is used to represent the current position in the current object) to the next position (preferably by decrementing the index).

Step (305) checks whether the cell has been written (this is usually determined based on the address rather than its current value). If it has been written, then the saved original value of the cell will be retrieved from the data structure where it is stored, and will be used instead of the current value of the cell (306). These steps are discussed in more detail in connection with FIG. 4.

The steps (305) and (306) are advantageously omitted in embodiments and applications where there have been no modifications to the tree since it was created, or if it is known that analyzing the current values suffices. In the multiobject garbage collection application these steps are generally needed, but the need for finding the last address of an unmodified subtree is likely to be more common in other applications.

Step (307) checks whether the cell is a heap cell pointing to within the same linearized tree. The cell points to within the same linearized tree if the address implied by the cell is within the address range of the entire linearized tree (i.e., greater than its starting address and less than the starting address plus its size, i.e., its end). Pointers to the root object are not considered pointers to within the same tree, as they imply cycles. In embodiments where there is only a single linearized tree (or the tree comprises no pointers to outside the tree), it is sufficient to check that it is a heap cell. In embodiments where the tree cannot contain back-pointers (cycles) to its root, the check for the cell pointing to its root can be omitted. In embodiments where all heap cells are valid pointers to within the tree and leaf-level objects do not contain any cells (i.e., they only contain object headers), this step could be omitted entirely as it would always return true. A cell could be a non-heap cell e.g. because it does not contain a tagged value or because its tag indicates that it does not contain a pointer value, or because its pointer value is such that it points to an area not considered part of the heap (many garbage collection systems carefully control the addresses that occur within programs and the value of the pointer may have significance; a common example is the NULL value).

Step (308) checks whether the value of the current cell (the original value, if it had been written) is larger than the largest cell encountered so far ('HIGH'). If so, (309) updates 'HIGH' (i.e., information about the end of the subtree) to the current cell.

The test in (308) may be redundant and it may be possible to leave it out, at least in some embodiments.

If the current cell was not larger than 'HIGH' in step (308), then the last cell in the subtree must already have been encountered, and execution continues from step (311) to compute the last address of 'HIGH' and return it in step (312).

Step (310) recurses into the object pointed to by the current cell by making the object referenced by the current cell the current object (as described for step (302)). This may or may not involve a function call and pushing a stack frame or context on a stack. The process then continues from step (303).

Even though the algorithm was described as tracking the largest cell encountered (and this is the preferred embodiment), it can equally well be implemented by computing the last address of the current object before step (308), making 'HIGH' the highest last address seen, and eliminating step (311) (or more precisely, in this embodiment computing the end of the subtree based on information saved during tracing means just returning the value 'HIGH', i.e., the computation is the identity function). A further alternative is to make 'HIGH' be the highest object starting address seen, and compute the end of that object in step (311). Numerous other variations will be obvious to one skilled in the art.

It is also easy to see that the value 'HIGH' is essentially the same as the cell pointing to the current object. Thus, it is not necessary to keep both 'HIGH' and the pointer to the current object (as described for step (302)) separately; it suffices to save one of them, and then (310) reduces to setting the index mentioned above to the index of the higest cell in the object.

The word tracing is used in the claims to refer to traversing the object graph of the subtree as illustrated in FIG. 3 and its various alternative embodiments. This use resembles its technical meaning in garbage collection, but here tracing preferably only visits some of the objects in the graph, rather than traversing the entire graph as is more common in garbage collection literature.

The use of the word recurse herein resembles its technical use in programming language literature. It generally refers to repeating or re-applying some method or function, usually to some smaller subproblem. There are two levels to the meaning to the word; one refers to the way a problem is described on a high level (e.g., in a high-level programming language), and the other to the way the processor actually executes compiled machine language instructions. Recursing is closely related to looping, and many ways are known for eliminating recursion. One recursion elimination method, applicable to 'tail recursion' (which is the case in FIG. 3 in the preferred embodiment) involves converting a recursive function call to an assignment followed by a goto (jump). FIG. 3 already shows this transformation done, even though the description speaks of recursion. Both implementation methods are possible. Another common recursion elimination method is to use an explicit stack (e.g. list) rather than the normal call stack. (It is also possible to replace certain loops in the method as presented by recursion, yielding an essentially equivalent program without deviating from the spirit of the invention.)

Figure 4:
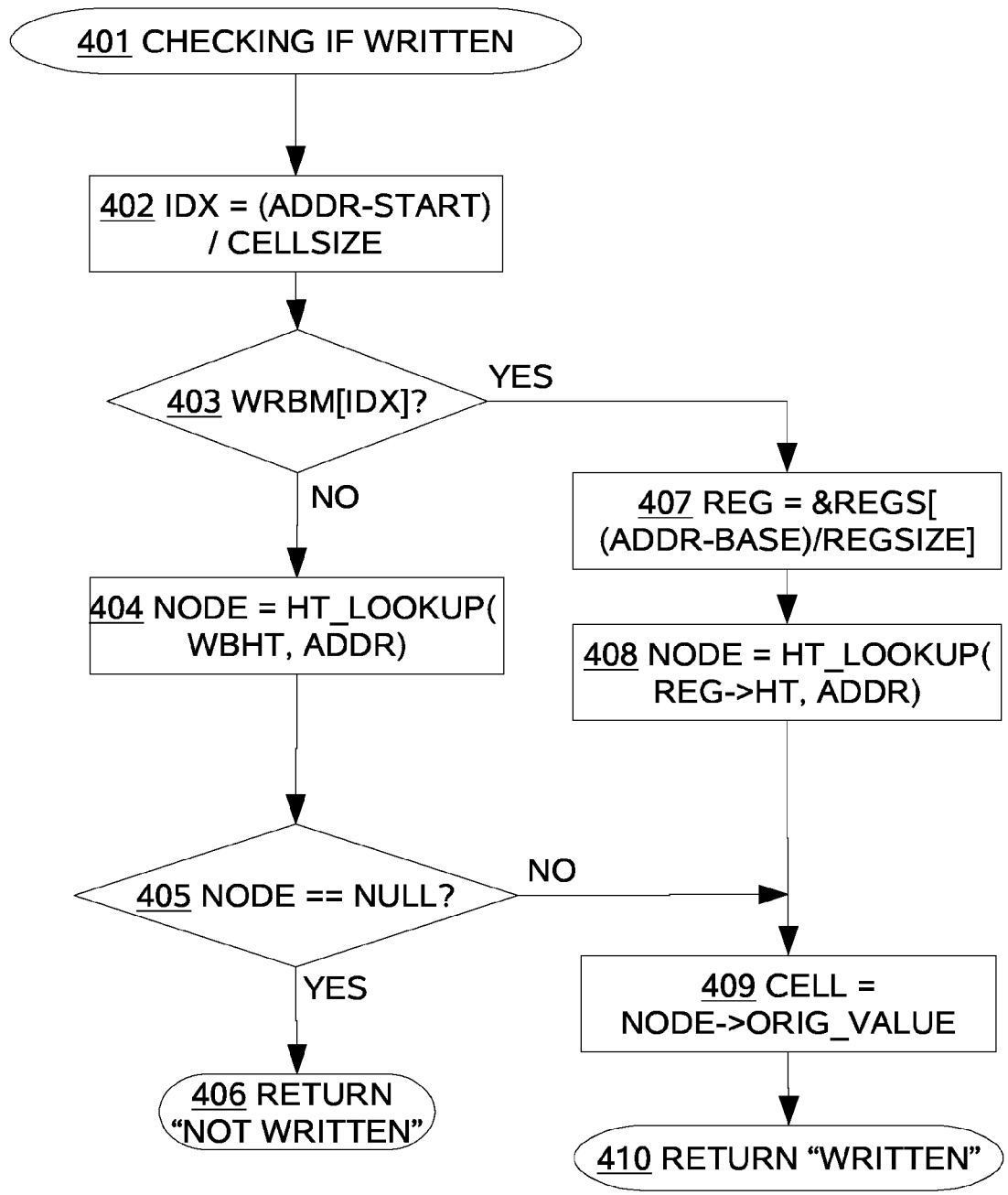
FIG. 4 illustrates using the combination of a bitmap and a hash table to determine if a cell has been written.

FIG. 4 describes steps (305) and (306) in more detail. The check whether the current object has been written becomes complicated in a system where arbitrarily many modifications may have occurred to the linearized tree being analyzed, and may even be occurring while it is being analyzed. In at least some such systems, concurrency control considerations and locking protocols may mandate that any modifications made to linearized trees in a particular memory region be available to a thread that has the region in which the linearized tree is stored locked by a synchronization lock, such as a mutex (Mutual Exclusion Lock), reader-writer lock, spinlock, or semaphore. In such systems, it may be advantageous to have each evacuation pause move the addresses and original values of any written cells from a hash table (or log buffer, or other suitable data structure) maintained by the write barrier to one or more other hash tables. Preferably, each independently collectable memory region has its own hash table for storing the original values of modified cells in that memory region, and the hash table is protected by the same synchronization lock as other region metadata.

In FIG. 4, it is assumed that the write barrier stores the original values of modified (written) cells in a hash table called 'WBHT'. The hash table is keyed by the address of the modified cell (though any value identifying the location could be used). Each address is stored only once in the hash table; if it is already stored, no modification is made to the hash table (the value must have been previously modified since the last evacuation pause). It is further assumed that at the beginning of each evacuation pause, the garbage collector moves all addresses and original values from 'WBHT' to per-region hash tables. 'REG' represents the metadata object for an independently collectable memory region, and 'REG->HT' represents the hash table for storing the original values in that region. 'NODE' represents a data structure for each original value, comprising e.g. the fields 'ADDR' and 'ORIG_VALUE'. It is further assumed that each linearized tree (multiobject) is followed by metadata (203) comprising a bitmap 'WRBM' indicating which cells of the linearized tree have been modified and moved to the per-region hash table (i.e., it is assumed that this bitmap is updated during moving, not by the write barrier). It is assumed that 'WRBM' may or may not contain values modified after the previous evacuation pause completed, but that 'WRBM' and 'REG->HT' are in sync (i.e., if the bit is set in 'WRBM', then the corresponding value can be found in 'REG->HT'). Using 'WRBM' is fully optional (search from 'REG->HT' could be performed instead), but improves performance.

FIG. 4 describes actions (401) that would replace both (305) and (306). The method could advantageously be inlined into the subprogram implementing (301), but could also be implemented as a separate subprogram or in hardware.

At (402), the index of the cell in the linearized tree is computed. 'ADDR' is the address from which a cell is being read; 'START' is the first memory address of the multiobject (or the first such address containing cells); 'CELLSIZE' is the size of a cell, typically 4 or 8 (bytes). The division can be implemented as a shift.

In (403), the bitmap indicating which cells have been written is indexed by the computed index. The index is a bit index; a typical idiom for accessing a bit vector in the C programming language is something like "(bitmap[idx/64] & (1L<<(idx % 64))) !=0". If the bit is set, we know it has been modified and that the original value exists in the region's hash table; if not, then we must check whether it has been modified after the last evacuation pause ended.

In (404), a lookup is made from the hash table of the write barrier. This case could return old values for entries in the hash table that have not yet been moved to the region's hash table. At (405) it is checked if we found a value in the hash table, and if not, (406) returns status indicating that it has not been written (when inlined into (301), just continues execution from (307)).

At (407), it is known that the cell has been modified, and its original value can be found in the region's hash table. First, it is determined which region the address resides in. Here, it is assumed that the regions are of fixed size 'REGSIZE', stored consecutively starting at address 'BASE', and that the metadata for regions is stored in array 'REGS' that can be indexed by the region number. Some regions (e.g., the large object area and/or nursery) could be handled specially here. However, many organizations are possible; this is just an example. Other known ways of finding the region metadata include storing the metadata at the start of the region (and aligning regions at 2^n boundary which is also their size, and masking away the lower bits of the address), or a tree lookup. Also, a single global hash table could be used; the reasons for preferring per-region hash tables relate concurrency control issues.

(408) looks up the address from the hash table. The returned value is here represented by 'NODE', but could also be the original value directly. In (409) the original value is extracted from the value returned from the hash table.

(410) denotes returning the value (continuing execution from (307)) and appropriate status to the caller. The returned original value replaces the value obtained in (304), and is used instead of the current cell value in (307) onwards.

It would also be possible to use a single hash table only ('WRBT'); then, (402), (403), (407), and (408) could be eliminated. However, such implementation may suffer from concurrency control bottlenecks or require using lock-free hash tables. It may be advantageous to implement 'WRBT' using a lock-free hash table even when using multiple hash tables.

Clearly, the description in FIG. 4 is highly dependent on particular implementation details of the overall system and is related to the multiobject garbage collection application. Clearly other applications are also possible, and many other ways of organizing the data structures are possible even for the garbage collection application. Exhaustively enumerating all the possibilities is not realistic, as they depend on the application and there are too many design variables to consider. Thus, particularly many variations are possible in this area and within the capabilities of an ordinary person skilled in the art.

Figure 5:
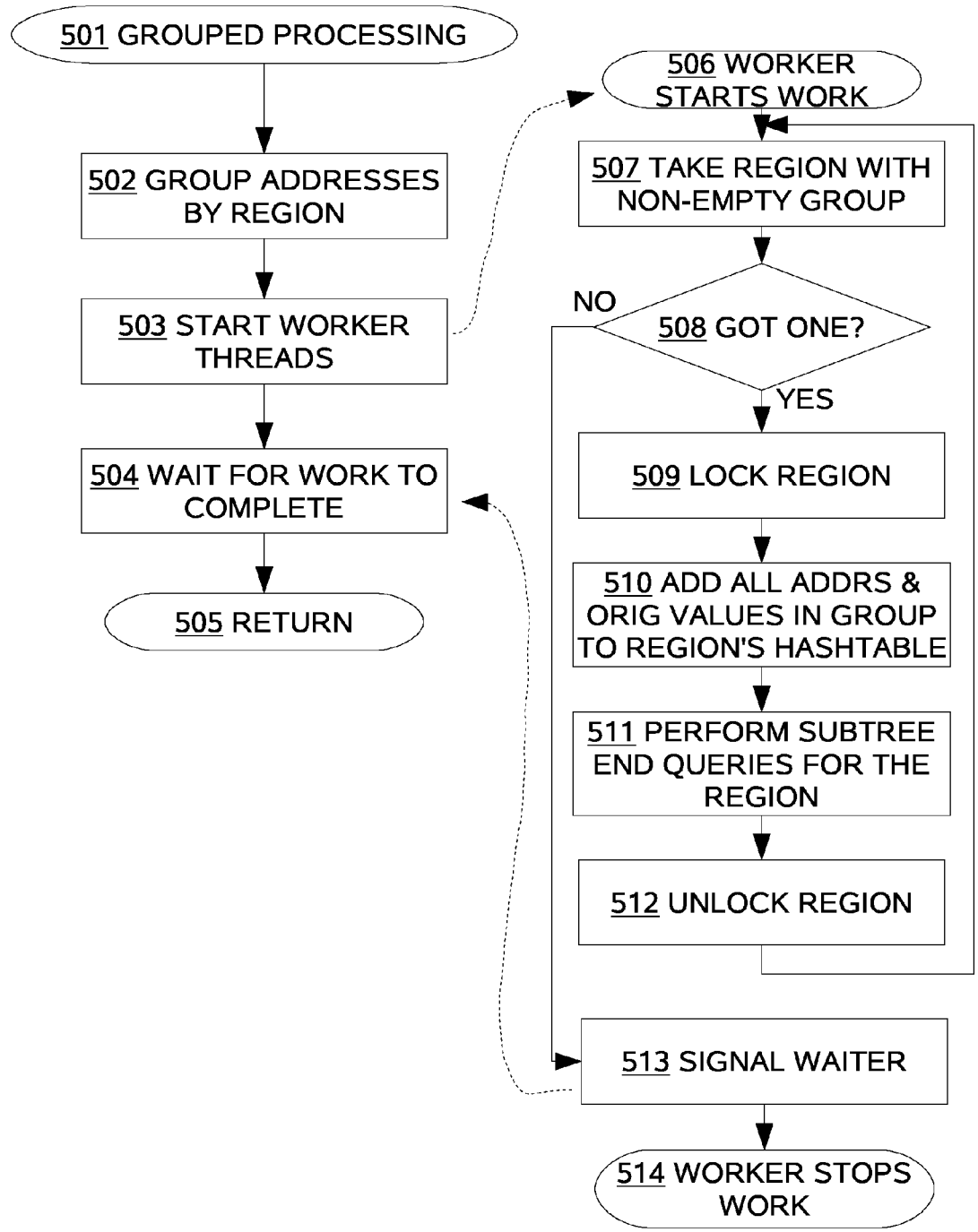
FIG. 5 illustrates having a hash table and a lock for each independently collectable memory region, and grouping operations for reducing lock contention.

FIG. 5 illustrates moving addresses and original values from 'WBHT' to per-region hash tables in groups using multiple worker threads. Advantageously, one such group would be created for each region that has updates in 'WBHT'. The main motivation for moving the values in groups is to reduce lock contention when using multiple parallel threads to perform the moving. Furthermore, it is common that the garbage collector needs to perform subtree range queries for old and new values of cells, and these queries would further compete for locks on the regions. This lock easily becomes a major performance bottleneck in a multiprocessor system. The goal of the method illustrated in FIG. 5 is to reduce lock contention by parallelizing these actions in such a way that several threads can perform the moving and the range queries for old and new values in parallel without lock contention (even without locking entirely if there is no other concurrent activity).

The sequence starting at (501) illustrates the actions preferably performed by the master thread controlling the evacuation pause. The actions starting at (506) illustrate steps performed by each worker thread, and multiple worker threads may be executing these steps in parallel. The dotted lines illustrate synchronization points between threads; the dotted arrow starting at (503) illustrates the master thread starting the worker threads (or waking them from sleep); with a thread implementation compliant with the POSIX standard this could be implemented using the pthread_cond_broadcast function. The second dotted arrow from (513) illustrates the worker thread signaling the master thread that a worker has completed its work; it could be implemented by e.g. decrementing the count of active workers and using the pthread_cond_signal function.

Step (502) is a placeholder for grouping the addresses by region. In an actual implementation this step might be intertwined with other actions performed either during the evacuation pause or in the write barrier; each group would advantageously be implemented as a list of addresses attached to the region metadata, and a separate list would advantageously be maintained of regions that have non-empty such lists. In such an implementation, (502) might not need to do any work at the start of the evacuation pause. However, the lists and groups could also be constructed at the beginning of the evacuation pause in step (502) by e.g. iterating over all addresses in 'WBHT', and determining the region in which each address resides and adding the address to the appropriate groups, creating new groups when no group yet exists for the region.

Step (503) starts the worker threads. A possible implementation is to set a variable to the number of worker threads and use the pthread_cond_broadcast function or its equivalent to start the threads.

Step (504) waits until all threads have completed. A standard idiom is to protect the global variable with a mutex, and loop until the global variable becomes zero, calling pthread_cond_wait in each iteration. A typical code sequence

```
pthread_mutex_lock (worker_lock) ;
while (num_active_workers > 0)
    pthread_cond_wait (worker_wait_cond, worker_lock) ;
pthread_mutex_unlock (worker_lock) ;
```

Step (505) just denotes that the grouped processing operation has completed (it might e.g. return from a subroutine, or indicate no action).

(506) indicates the place where a worker thread starts. Outside this, a worker thread would typically sleep in a loop on pthread_cond_wait in code something like this (step (513) is also included here for illustration):

```
pthread_mutex_lock(worker_lock);
for (;;)
    {
        pthread_cond_wait(worker_sleep_cond, worker_lock);
        MULTIPLEX ON POSSIBLE WORK TYPES/ACTIONS
        HERE;
        pthread_mutex_unlock(worker_lock);
        CODE FOR (506) . . . (514) TO GO HERE;
        pthread_mutex_lock(worker_lock);
        num_active_workers--;
        pthread_cond_signal(worker_wait_cond);
    }
pthread_mutex_unlock(worker_lock);
```

Step (507) takes a group from the list (set) of all groups. The list may be protected by a lock, or a lock-free method of taking an element from a list may be used. Instead of a list, many other alternatives are possible, including various set or bag data structures, iterating over all regions, etc.

Step (508) checks whether a group was obtained, and exits the loop if there are no more groups (no more work to do) by going to (513).

Step (509) locks the synchronization lock associated with the region. In some embodiments locking might be omitted entirely. The description here assumes that a lock is associated with each region, but it is also possible to have one lock cover several regions, or have several locks (and hash tables) per region. It is preferable that a group corresponds to a lock, but this is not a necessity; it would also be possible to have more than one group per lock, e.g. to divide very large groups into several smaller groups to keep "work packets" of reasonable size, though parallel processing of groups referring to the same lock is generally not beneficial as the whole idea of grouping was to reduce lock contention.

Step (510) illustrates adding the addresses and original values in the region's hash table. This step may also include removing the addresses from the 'WBHT'; alternatively, such removing could be done as a separate step (possibly clearing the entire hash table at once). This step would typically involve a loop that iterates over all addresses in the group, processing them one at a time.

Step (511) is optional, and illustrates that subtree range queries could be performed here while we have the region locked, so that no separate locking is needed for them, reducing lock contention. The range queries could be grouped into the same groups as written addresses, but using either the old or the new value of the cell to determine the region (and group) rather than the address.

Step (512) unlocks the region (it is only present if locking is used).

Step (513) signals the master thread that a worker has completed its work; it was illustrated above in conjunction with step (506).

Step (514) is just a placeholder for the worker thread having completed its work. Typically the thread would then go to sleep waiting for more work to do.

Figure 6:
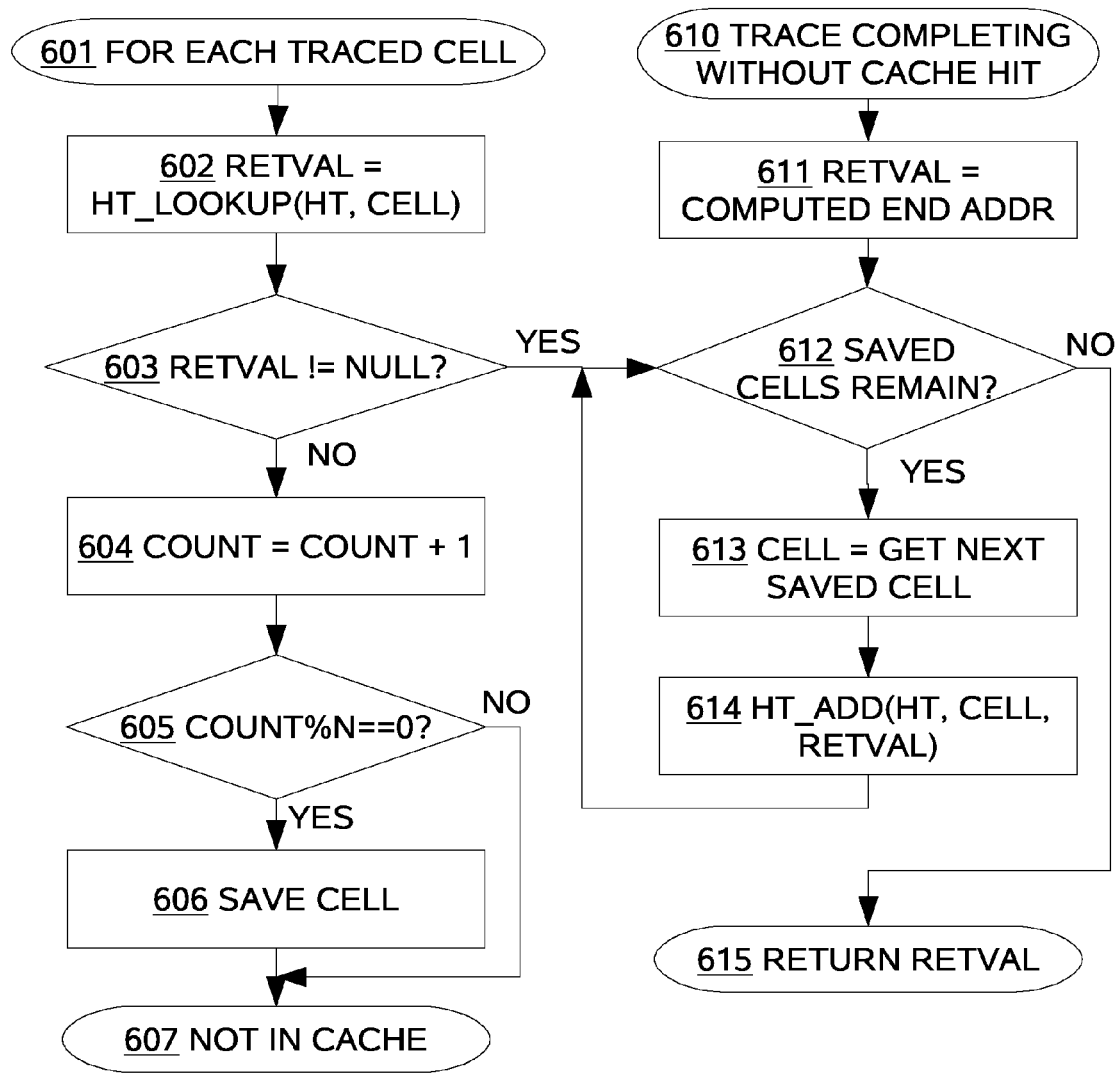
FIG. 6 illustrates the use of caching in determining the last address of a subtree.

FIG. 6 illustrates the use of caching to eliminate the worst-case $O(N^2)$ behavior when performing operations that write very many cells, such as destructive list reversal.

The steps in FIG. 6 would advantageously go between steps (307) and (308) in FIG. 3; however, they could also be inserted earlier if using an address as the key to the cache. The cache lookup should also be performed at (301) to check if the answer is immediately in the cache for the root of the subtree.

The code as illustrated in FIG. 6 has two entry points: (601) is the one that goes after (307), and (610), which would go between (311) and (312). The code also has two exits: (607) goes to (308) and (615) to (312). Variations on the embedding are also possible.

Step (602) checks if the current node can be found from the cache. Advantageously, it uses the cell as the key into the hash table that acts as the cache, as this allows easy lookup also for the root of a subtree. Alternatively, e.g. the address of the cell could be used, but then finding the root from a cache becomes more problematic. Any other data structure suitable for use as a cache could also be used, including but not limited to balanced trees, skip lists, and sorted arrays. The cache could be either global or per-region (in the description it is shown as being global, but for concurrency control reasons it may be preferable to make it per-region similar to the hash table for storing the original values).

Step (603) tests if a result was found from the cache. If not, the cell may be selected for insertion into the cache once a result has been found. In the embodiment shown, this is implemented using a counter 'COUNT', and adding every Nth cell. The counter is incremented in step (604), and step (605) tests if the counter modulo N is zero (if N is a constant power of two, then the test is a fast bitwise and operation). If the counter modulo N is zero, then step (606) saves the current cell in a suitable data structure (such as a list, array, or stack; the lifetime of the data structure is that of the range query operation, and it is only accessed by one thread, so it can advantageously be stored on the thread's stack). Step (607) indicates continuing the search as no cached value was found.

When the range query completes in the normal way (without finding a cached value), control enters (610). At (611), the actual return value is computed. Step (612) onwards saves the result in the cache for all cells saved in step (606), if any. Step (612) itself tests if there are more cells for which it should be saved, step (613) gets the next cell from the data structure, (614) adds the result to the cache data structure using that cell as the key.

As an alternative to caching (i.e., dynamically saving computed ends of trees for some suitably selected objects in the tree), it is also possible to precompute and save the subtree end addresses for some selected objects when the linearized tree is originally constructed, and use this saved data similarly to the cached method. Such a method can be seen as a compromise or cross-breed between the caching method and the method of Gopalakrishna and Madhavan. The latter method computes and saves the subtree end addresses (or the right sibling addresses, from which the end addresses can be easily computed) for all nodes in the tree. The caching method saves the end addresses for some nodes, but not all nodes, and uses tracing to reach an object with a cached value or an object which is the rightmost node (i.e., has no heap cells pointing to within the same linearized tree). The objective is to ensure that tracing never needs to visit more than a relatively small number of objects.

The combined method computes and saves the subtree end addresses for some strategically selected subset of objects when the tree is created. If tree sizes are limited, both the offset of an object within a linearized tree (multiobject) and the offset of the end of a subtree relative to the start of the linearized tree can be stored as unsigned 16-bit integers. In fact, if minimum object alignment is 16 bytes, the offsets will be multiples of 16, and can be divided by 16 (or equivalently, shifted right by 4) before storing, allowing offsets up to one megabyte to be stored in 16 bits. The computed subtree end addresses for the selected nodes are advantageously stored in an array of such 16-bit integers, two integers per object. One of the integers (preferably the first) is the offset of the object in the linearized tree, and the other is the offset of the end of the subtree rooted by that object in the linearized tree. The pairs in the array are sorted into ascending (or descending) order by the offset of the object, so that a binary search can be used to quickly locate a particular object (or the offset at the next higher address). Equivalently, the data could be stored in two arrays, or a single array could be split to two halves; the essential part is that we have a sorted array or otherwise searchable data structure for the object offsets, and a way of efficiently finding the corresponding end offset. Besides offsets, also cell values, pointers, or other suitable identifiers could be used in the array to refer to objects.

There are many possible ways of selecting the objects for which data is cached. The goal is that no tracing operation should need to visit more than M objects before encountering either a cached (precomputed) value or a node with no heap cells pointing to within the same linearized tree. Clearly, there is no need to cache any values for objects where the rightmost (or leftmost, depending on the order) path to a node with no heap cells pointing to within the same linearized tree is shorter than M objects. From thereon, any rightmost (or leftmost) path from an object with a cached value towards the root should not have more than M consecutive objects without a cached value. This constraint can either be followed exactly during construction, or it can be fulfilled satisfactorily by statistically adding a cached value for any node with a probability of 1/M. Many variations for the selection are possible, but they are likely to yield roughly equivalent results in practice.

The net result is that at most about one object in M will have a cached value. If M is 16, and the minimum object size (object alignment) is 16, this means storing in the worst case approximately one 4-byte value per 256 bytes, implying about 1.6% space overhead. With M=32, the space overhead is approximately 0.8%.

The sorted array of the pairs would advantageously be stored as part of the metadata (203) for a linearized tree (multiobject), and thus no separate management for these arrays would be needed.

Lookups from a sorted array can be performed using a binary search. It may also be possible to optimize further searches by not performing full searches. For example, to deal with the fairly common case of a long list, it may be beneficial to compare against the next pair before resorting to full binary search. However, binary searches on the relatively small sorted arrays in question are extremely efficient anyway, so it may not be worthwhile to try to optimize.

With this method (precomputed searchable data structure), there is no need to ever add values to the cache or use a hash table or a replacement policy for caching.

While some CPU time overhead for constructing the sorted vector remains, this method can be seen to completely eliminate the worst-case O(N^2) and O(N) cases from determining the last address of the subtree. With this method, the worst case is O(1) (the constant being proportional to M).

The precomputing is advantageously performed when the multiobject is created, but could alternatively be performed e.g. when the first write to the multiobject occurs or is moved to the per-region hash table, or when first needed.

Figure 7:
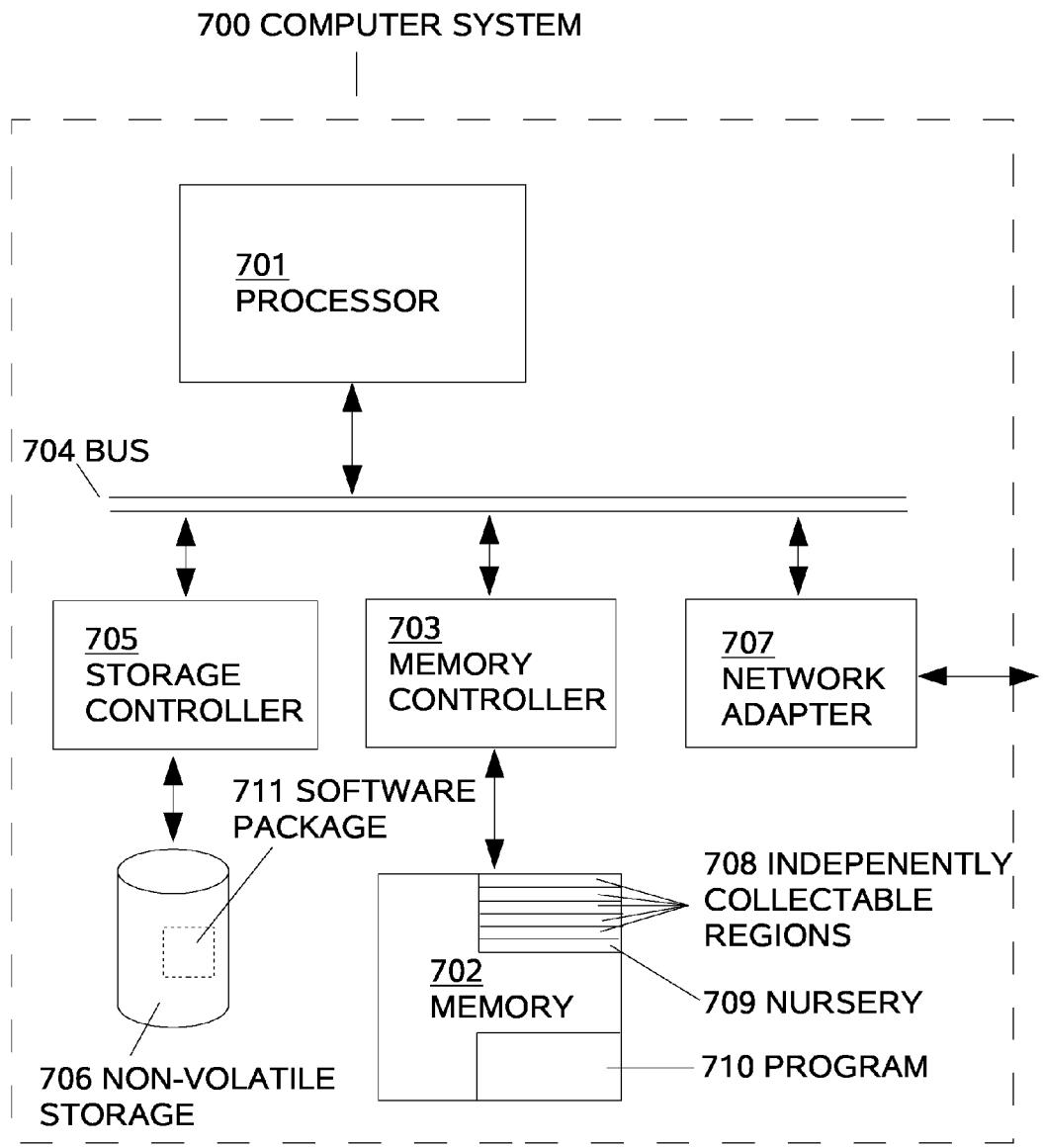
FIG. 7 illustrates a computer system comprising a means for determining the range of a subtree of the original version of a modified linearized tree.

FIG. 7 illustrates a computer system (700) according to the present invention. (701) is a processor (though many targeted systems will have several processors or processor cores), (702) illustrates main memory (typically volatile storage, such as SDRAM), (703) illustrates the memory controller (possibly integrated into the processor), (704) illustrates the system bus, (705) illustrates a storage controller, such as a SCSI controller or any other known or future non-volatile storage controller, (706) is a non-volatile storage device, such as a magnetic disk, optical disk, flash memory, storage crystal or any other future non-volatile memory device, and (707) is a network adapter for interfacing the computer system to a data communications network, such as a LAN, WAN, ethernet, the Internet, or a wireless network (e.g., 3G, GPRS, WLAN, or CDPD).

Elements (708) represent independently collectable regions in memory. Advantageously most regions are of the same size which is a power of two and the regions are stored at contiguous virtual memory addresses, as discussed for step (407). However, some regions may be special, such as the nursery (709), a large object area, and a popular object area.

Element (710) represents program code in main memory that comprises a program code means for causing the computer system to perform the steps illustrated in this description, drawings and claims for determining the range of a subtree. The invention is, however, not limited to having a program cause the computer to perform the steps; instead, some or all of the steps might be implemented in hardware such as logic that implements them with state machines and combinatorial elements.

Element (711) represents a software package stored in non-volatile memory that comprises a program code means for causing a computer system to perform the steps illustrated in the description, drawings and claims for determining the range of a subtree. Most general purpose computer systems will store software packages in non-volatile storage, and only load the program code into volatile memory when actually executing the software package or particular program code pages therein. A computer with the program code means currently only stored in non-volatile storage is still capable of performing the described steps with the additional step of loading the program code into non-volatile memory (though some computers, especially embedded systems, are capable of executing program code directly from non-volatile storage such as ROM or flash).

The computer may also make the software package (711) and the program code means contained therein available for downloading to other computers in whole or in parts using protocols such as TCP/IP, FTP, TFTP, RDIST, HTTP, HTTPS, various peer-to-peer protocols, NFS, Windows file sharing, Novell Netware, or other file sharing/distribution protocols thereby causing other computers to perform the steps illustrated in FIGS. 3 to 6 and the text. Some of the protocols, particularly peer-to-peer protocols, may allow different parts of the software package to be downloaded from different computers, and thus a particular computer may only transmit a part of the software package containing the program code means while still being essential in enabling the download and causing other computers to perform the steps.

FIG. 8 illustrates a computer readable software distribution medium (801) having computer usable program code means (803) embodied therein for causing the range of a subtree of a linearized tree to be computed. Frequently, the program code means (803) would be embedded in a larger program code means (802) that performs various other operations besides those described in this disclosure. The program code means (803) comprises a computer usable program code means for tracing the cells within each traced object in the applicable reverse order of the order in which the objects were stored when the linearized tree was constructed; a computer usable program code means for checking, for at least some cells encountered during tracing, whether the value of the cell is a heap cell that points to within the address range of the linearized tree, and if so, recursing into the object pointed to by that cell; a computer usable program code means for updating, for at least some cells encountered during tracing, information about the end of the subtree. In many embodiments, it would further comprise a computer usable program code means for saving the original values of at least some written cells as part of a write barrier; and a computer usable program code means for checking, for at least some cells encountered during tracing, whether the cell has been written, and if so, using the original value of the cell instead of the current value of the cell.

What has been described for a linearized tree in left-to-right depth first search order applies mutatis mutandis to a linearized tree in right-to-left depth first order, with the orders and sides reversed. The method may also be applicable to other orders, and is not intended to be limited to these orders.

Even though the method has been described for determining the last address of a subtree, it is equally applicable to determining the first address of a subtree of (the original version of) a linearized tree. As described, it was assumed that the tree had been constructed by traversing the objects in preorder (i.e., visiting the parent node before its children). In this case, the root node is the first node of the subtree. However, the method is equally applicable if the linearized tree was constructed in inorder (i.e., left subtree first, then parent, then right tree) or in postorder (parent after both subtrees).

For both inorder and postorder, the first address of the subtree must be determined explicitly. This can be performed by traversing the subtree in the same order in which it was constructed (i.e., the index counts from zero to the size of the current object, and (303) tests for the index being larger than the size of the current object, and (304) increments rather than decrements, and the comparison in (308) is reversed; (311) computes the start of the object rather than the end (e.g. by stripping tag bits, or it may become the identity function), and the start address is returned in (312).

In other words, a method for computing the start of a subtree (for inorder and postorder trees) comprises tracing the cells within each traced object in the same order in which the objects were stored when the linearized tree was constructed; for at least some cells encountered during tracing, checking whether the value of the cell is a heap cell pointing to within the same linearized tree, and if so, recursing into the object pointed to by that cell; for at least some cells encountered during tracing, updating information about the start of the subtree; and computing the start of the subtree based on information saved during tracing when an object containing no heap cells pointing to within the same linearized tree is encountered. A method computing the start of a subtree of the original version of a modified linearized tree additionally comprises saving the original values of at least some written cells as part of a write barrier; and for at least some cells encountered during tracing, checking whether the cell has been written, and if so, using the original value of the cell instead of the current value of the cell.

For inorder, both addresses must be determined according to the applicable method. For postorder, only the first address needs to be determined; the last address is trivially computed by adding the size of the root node to the start address of the root node, as in a linearized tree constructed using postorder traversal the root is the last object of the tree.

Combining the methods for determining the start and the end of a subtree yields a method for determining the range of a subtree of a linearized tree, the method comprising: tracing at least part of the linearized tree; inspecting cells within each traced object in the applicable order (where the applicable order is the applicable reverse order when determining the end of the subtree and the original order when determining the start of the subtree); for at least some of the inspected cells, checking whether the value is a heap cell pointing to within the same linearized tree, and if so, recursing into the object pointed to by that cell; for at least some of the inspected cells, updating information about the applicable end of the subtree (either the start or the end); computing at least one end (i.e., the start or the end) of the subtree based on information saved during tracing when an object containing no heap cells pointing to within the same linearized tree is encountered. Especially for inorder, some of the steps may be applied twice (e.g., first tracing to find the start, and then to find the end).

Although preferred embodiments of the method, computer system and product embodying the present invention have been illustrated in the accompanying drawings and described in the herein, it will be understood that the invention is not limited to the embodiments disclosed, but is capable of numerous rearrangements, modifications and substitutions without departing from the spirit of the invention as set forth and defined by the claims.

What is claimed is:

1. A method of determining the end of a subtree of a linearized tree, the method comprising:
   tracing, by one or more processors, at least one object in a linearized tree;
   inspecting, by the one or more processors, cells within the traced object in the applicable reverse order of the order in which objects were stored in the linearized tree when the linearized tree was constructed;
   for at least one of the inspected cells, checking, by the one or more processors, whether the value of the cell is a heap cell pointing to within the same linearized tree, and if so, recursing into the object pointed to by that cell;
   for at least one of the inspected cells, updating, by the one or more processors, information about the end of the subtree; and
   computing, by the one or more processors, the end of the subtree based on information saved during tracing when an object containing no heap cells pointing to within the same linearized tree is encountered.

2. The method of claim 1, further comprising:
   saving the original value of at least one written cell as part of a write barrier; and
   for at least one of the inspected cells, checking whether the cell has been written, and if so, using the original value of the cell instead of the current value of the cell as the value of the cell.

3. The method of claim 2, wherein:
   checking whether the cell has been written comprises reading a bit from a bitmap indicating which cells have been written, the index to the bitmap being computed from the address of the cell; and
   using the original value comprises retrieving the original value from a hash table.

4. The method of claim 1, further comprising:
   precomputing a searchable data structure containing an identifier and information from which the subtree end address can be efficiently computed for at least one object contained in the linearized tree; and
   checking said searchable data structure for at least one cell inspected during tracing, and if a result is found in said searchable data structure, returning the subtree end address computed from information stored in the data structure for the object corresponding to the cell value.

5. The method of claim 4, wherein the searchable data structure is a one-dimensional array containing pairs of 16-bit integers sorted by one of the integers, and the method further comprising:
   performing a binary search in said array to check if a value for a particular object is present in the array.

6. A computer usable software distribution medium having computer usable program code means embodied therein for causing the end of a subtree of a linearized tree to be computed by a computer, the computer usable program code means in said computer usable software distribution medium comprising:
   a non-transitory computer usable software distribution medium;
   computer usable program code means for tracing at least one object in a linearized tree;
   computer usable program code means for inspecting cells within the traced object in the applicable reverse order of the order in which the objects were stored in the linearized tree when the linearized tree was constructed;
   computer usable program code means for checking, for at least one of the inspected cells, whether the value of the cell is a heap cell pointing to within the same linearized tree, and if so, recursing into the object pointed to by that cell;
   computer usable program code means for updating, for at least one cell inspected during tracing, information about the end of the subtree; and
   computer usable program code means for computing the end of the subtree based on information saved during tracing when an object containing no heap cells pointing to within the same linearized tree is encountered.

7. The computer usable software distribution medium of claim 6, wherein the computer usable program code means further comprises:
   computer usable program code means for saving the original value of at least one written cell as part of a write barrier; and
   computer usable program code means for checking, for at least one of the inspected cells, whether the cell has been written, and if so, using the original value of the cell instead of the current value of the cell as the value of the cell.

* * * * *